(12) United States Patent
Martin

(10) Patent No.: US 12,539,637 B2
(45) Date of Patent: Feb. 3, 2026

(54) METHOD AND DEVICE FOR PRODUCING SAWN TIMBER

(71) Applicant: Gebrüder Linck, Maschinenfabrik 'Gatterlinck' GmbH & Co. KG, Oberkirch (DE)

(72) Inventor: Andreas Martin, Neuried (DE)

(73) Assignee: Gebrüder Linck, Maschinenfabrik 'Gatterlinck' GmbH & Co. KG, Oberkirch (DE)

( * ) Notice: Subject to any disclaimer, the term of this patent is extended or adjusted under 35 U.S.C. 154(b) by 397 days.

(21) Appl. No.: 17/965,920

(22) Filed: Oct. 14, 2022

(65) Prior Publication Data

US 2023/0121756 A1 Apr. 20, 2023

(30) Foreign Application Priority Data

Oct. 14, 2021 (DE) .......................... 102021126725.0

(51) Int. Cl.
*B27B 1/00* (2006.01)

(52) U.S. Cl.
CPC .................................... *B27B 1/007* (2013.01)

(58) Field of Classification Search
CPC ......... B27B 1/005; B27B 1/007; B27C 1/004; B27C 1/08
See application file for complete search history.

(56) References Cited

U.S. PATENT DOCUMENTS

| | | | | |
|---|---|---|---|---|
| 6,161,603 A | * | 12/2000 | Rautio | B27B 1/007 144/377 |
| 7,849,894 B2 | * | 12/2010 | Strebig | B27B 1/007 144/1.1 |
| 10,173,338 B2 | * | 1/2019 | Ekevad | B23D 59/002 |
| 2002/0074062 A1 | | 6/2002 | McGehee et al. | |
| 2004/0045634 A1 | | 3/2004 | Stager | |

FOREIGN PATENT DOCUMENTS

| | | |
|---|---|---|
| DE | 4291883 | 4/1994 |
| DE | 4400600 | 4/1997 |
| DE | 10203871 | 8/2002 |
| EP | 2404721 | 1/2012 |
| EP | 2439030 | 4/2012 |
| WO | 2006045403 | 5/2006 |

* cited by examiner

*Primary Examiner* — Matthew Katcoff
(74) *Attorney, Agent, or Firm* — Volpe Koenig

(57) ABSTRACT

In order to increase the obtainable sawn timber volume in the side board region during the production of sawn timber from a tree trunk, in a method in which the tree trunk is canted at at least two sides, preferably four sides, a remaining wane region is milled out at at least two mutually opposite corner regions by milling tools, and a side product board is cut off by a saw cut along a plane bounded by the corner regions, it is provided that, to mill out the corner regions, the milling tools are moved relative to the tree trunk in an arc, predefined on the basis of a measurement of the tree trunk, by virtue of the fact that, during a feed movement of the tree trunk relative to the milling tools, said milling tools are adjusted so as to follow the arc.

11 Claims, 3 Drawing Sheets

METHOD AND DEVICE FOR PRODUCING SAWN TIMBER

INCORPORATION BY REFERENCE

The following documents are incorporated herein by reference as if fully set forth: German Patent Application No. 10 2021 126 725.0, filed Oct. 14, 2021.

TECHNICAL FIELD

The present invention relates to a method for producing sawn timber from a tree trunk, in which method the tree trunk is canted, or straightened by slabbing, at at least two sides, preferably four sides, a remaining wane region is milled out at at least two mutually opposite corner regions by milling tools, and a side product board is cut off by means of a saw cut along a plane bounded by the corner regions. The invention furthermore relates to a corresponding device having one or more chipper canters or saws, two or more milling tools, and a sawing device. The invention finally also relates to a method for ascertaining a cutting solution for a tree trunk, in which method the tree trunk is canted, or straightened by slabbing, at at least two sides, and, before or after the canting or slabbing operation, is measured and, on the basis of the measurement data, a cutting solution for dividing up the tree trunk into sawn timber comprising a single- or multi-part main product and one or more side product boards is ascertained.

BACKGROUND

When dividing up tree trunks into sawn timber, it is the aim to obtain the greatest possible sawn timber volume from the natural shape of the round timbers. For this purpose, the tree trunk is optically measured and a cutting solution is ascertained by virtue of possible sawn timber dimensions being mathematically fitted into the profile of the trunk.

For the dividing-up process, a squared timber is firstly generated by virtue of the tree trunk being canted at four sides using chipper canters. Side product boards are produced in the edge region of the tree trunk. For this purpose, it is firstly the case that pairs of mutually opposite waney corner regions are milled out, and the side product boards are cut off along a cutting plane defined by the corner regions.

It is possible both for multiple side boards to be generated at each side, and for side boards to be generated with a diagonal situation of the boards in the round timber/squared timber. Depending on the curvature of the trunk, the side product boards may be planar or, by canting and milling operations following an arc, produced so as to be arched over the length. The squared timber that has been canted on four sides is in this case generally produced with two first parallel straight surfaces and two second parallel but curved surfaces. It is commonly the case that, before or after the canting operation, the tree trunk is three-dimensionally measured and the cutting solution is ascertained. In accordance with the ascertained cutting solution, after the corner regions have been milled out, first side boards are cut off at the straight surfaces at both sides of the squared timber, before the squared timber is rotated through 90° and guided, following an arc, through a sawing device that is set in accordance with the cutting solution, such as a frame saw.

SUMMARY

It is the object of the present invention to further increase the sawn timber volume that can be obtained in the side board region.

The object is achieved by a method for producing sawn timber and a device having one or more of the features disclosed herein. Advantageous refinements are described below and in the claims. Also specified are a method for ascertaining a cutting solution with an optimized sawn timber yield, and a calculation device for ascertaining a cutting solution, each having one or more of the features disclosed herein.

In a method of the type stated in the introduction, it is provided according to the invention that, to mill out the corner regions, the milling tools are moved relative to the tree trunk in an arc, predefined on the basis of a measurement of the tree trunk, by virtue of the fact that, during a feed movement of the tree trunk relative to the milling tools, said milling tools are adjusted so as to follow the arc. The saw cut with which the respective side product board is cut off is made here along the plane in which the curvature of the milled edge generated by means of the milling tools lies.

Here, an underlying concept of the invention consists in intentionally allowing, for side product boards, a sickle-shaped curvature of the board, the so-called crook, and taking this into consideration in the ascertainment of the cutting solution. In this way, it is possible to generate not only boards which are curved so as to follow the curvature of the trunk, as in the case of the cutting pattern following an arc, but also crooked side boards which are curved, perpendicularly with respect to the trunk curvature, over their narrow longitudinal edge. Such crooked boards can subsequently be straightened again by way of cross-cuts and finger joints, or the crooked boards may, with their crooked contour, be installed for intermediate layers of laminated timber panels and pressed into a straight form there in the process. By allowing for crooked side product boards, the yield of, in particular, so-called rough sawn side product can be significantly increased.

If the tree trunk is oriented such that its curvature lies in a horizontal plane, the milling tools may be adjusted horizontally in order to generate the relative movement corresponding to the arc. The respective side product board may accordingly be cut off by way of a horizontal saw cut.

In one preferred embodiment, however, for the milling-out of the corner regions, the canted tree trunk (squared timber) is rotated such that its curvature lies in a vertical plane, it further preferably being the case that the ends of the squared timber point downwards. In order to generate the relative movement corresponding to the arc, the milling tools are in this case adjusted vertically. The arcuate profile of the milled-out corner regions is thus situated at the straight, non-curved surfaces of the squared timber and can be adapted to the curvature profile of the tree trunk. The respective side product board can then be cut off by way of a vertical saw cut without further rotation of the squared timber.

After the side product board and optionally further side product boards have been cut off, the tree trunk may expediently be rotated such that its curvature now lies in a horizontal plane. The tree trunk is subsequently guided, in a trajectory that follows its curvature, through a second sawing device that incises vertically. The main and side product boards generated here therefore no longer have a crook, but are rather curved following the curvature of the trunk. This bend can however be straightened during subsequent drying of the boards, such that the boards generated in the second sawing step have substantially no crook.

It is preferable if the corner regions on a squared timber that has been canted at four sides are milled out, and respective side product boards cut off. It is however also possible for the tree trunk to initially be canted only at two opposite sides, for corner regions with wanes at these sides to be milled out, and for in each case one side product board to be cut off. It is however also possible at the same sides, in a respectively stepped manner, for further corner regions to be milled out and further side product boards, for which a crook is likewise admissible, cut off. It is likewise possible for the tree trunk, instead of being canted, to be straightened by slabbing at at least one side, and for corner regions to subsequently be milled out.

During the milling-out of the corner regions, a wane that remains on the tree trunk after the canting or slabbing operation is therefore not necessarily completely removed, with only a certain waney (partial) region being removed. Rather, the wane may also be gradually milled out in multiple milling steps, for example in order to successively cut off multiple side boards of increasing width.

For the calculation of the cutting solution, it is possible according to the invention for a tolerance range to be specified. Here, the arc is defined such that the subsequently cut-off side panel board has a crook that lies within the tolerance range. The tolerance range may be selected such that the generated side product boards can still be used for an intended application, or still fall within a particular sorting class. The larger the selected tolerance range, the greater the yield of the rough sawn side product. The invention thus also makes it possible, through specification of a tolerance range adapted to the respective use, to influence the achieved yield.

It is additionally possible for the arc along which the milling tools are moved relative to the tree trunk to be ascertained, in a manner dependent on a curvature of the tree trunk ascertained by way of the measurement, so as to yield a curve which has a different curvature in certain portions, in particular also a curve which has an opposite curvature in certain portions. The invention thus encompasses the generation of side product boards which, in certain portions, have a crook that lies in each case in the specified tolerance range.

The measurement and ascertainment of the cutting solution may in principle be performed both before and after the canting operation. It is likewise possible for a first measurement to be performed before the canting operation, and a first cutting solution ascertained, and a renewed measurement to be performed after the canting operation, and an optimized cutting solution optionally ascertained.

In a preferred embodiment of the invention, the measurement of the tree trunk is performed after it has been canted at four sides. In particular, a first measurement may be performed on the tree trunk prior to the canting operation, which first measurement serves for ascertaining the direction of curvature and an initial rotation of the trunk for the canting operation. After the canting operation, a second measurement of the squared timber is performed, on the basis of which the cutting solution, and the curvature of the side product boards to be generated in rough sawn form, are ascertained. The two-stage measurement results in improved accuracy and a greater yield of sawn timber volume.

In one refinement of the invention, provision may furthermore be made whereby the milling tools, during their adjustment movement that follows the predefined arc, are additionally pivoted, in particular pivoted such that a milling plane defined by the respective milling tool tangentially follows the arc. In this way, the milling tools are prevented from cutting into the already-milled region again during the adjustment movement.

A device according to the invention for producing sawn timber from a tree trunk has one or more chipper canters, which are arranged so as to cant the tree trunk at at least two, preferably four, sides, two or more milling tools, which are arranged so as to mill out a remaining wane region at at least two mutually opposite corner regions, and a sawing device, which is arranged so as to cut off a side product board by means of a saw cut along a plane bounded by the corner regions. For this purpose, the device has a controller that actuates the device such that, to mill out the corner regions, the milling tools are moved relative to the tree trunk in an arc, predefined on the basis of the measurement of the tree trunk, by virtue of the fact that, during a feed movement of the tree trunk relative to the milling tools, said milling tools are adjusted, in particular adjusted vertically, so as to follow the arc. The controller is in particular configured to actuate the device such that one or more of the above-discussed method steps are carried out. As an alternative to the chipper canters mentioned above, it is also possible for saws to be provided by means of which a slab of the tree trunk is cut off at two or four sides in order to straighten said tree trunk for the subsequent milling-out of the corner regions.

In a method for ascertaining a cutting solution for a tree trunk, in which method the tree trunk is canted, or straightened by slabbing, at at least two sides, preferably at four sides, and, before or after the canting or slabbing operation, is measured and, on the basis of the measurement data, a cutting solution for dividing up the tree trunk into sawn timber comprising a single- or multi-part main product and one or more side product boards is ascertained, it is provided according to the invention that, for the one or more side product boards, a tolerance range for a maximum admissible crook is specified and, with the cutting solution, an arc for at least one side product board is ascertained, along which waney corner regions of the tree trunk, which form the edging on the subsequent side product board, are to be milled out before the respective side product board is cut off, the arc being dimensioned such that a resulting crook of the side product board after the latter has been cut off lies within the specified tolerance range.

A corresponding calculation device for ascertaining a cutting solution for a tree trunk is adapted in terms of programming technology to ascertain, from measurement data of a tree trunk, which measurement data have been obtained before or after a canting or slabbing operation, a cutting solution for dividing up the tree trunk into sawn timber comprising a single-or multi-part main product and one or more side product boards. According to the invention, for the one or more side product boards, a tolerance range for a maximum admissible crook can be specified, and the calculation device is adapted to ascertain, with the cutting solution, an arc for at least one side product board, along which waney corner regions of the tree trunk are to be milled out before the respective side product board is cut off, the arc being dimensioned such that a resulting crook of the side product board after the latter has been cut off lies within the specified tolerance range.

BRIEF DESCRIPTION OF THE DRAWINGS

Further advantageous features and characteristics of the invention will emerge from the following description of an exemplary embodiment on the basis of the figures, in which.

DETAILED DESCRIPTION

The working operations involved in the production of sawn timber from round timber according to an exemplary embodiment are schematically illustrated in FIGS. 1A-1F, with a cross section of the processed workpiece after every processing step being shown.

Figure 1:
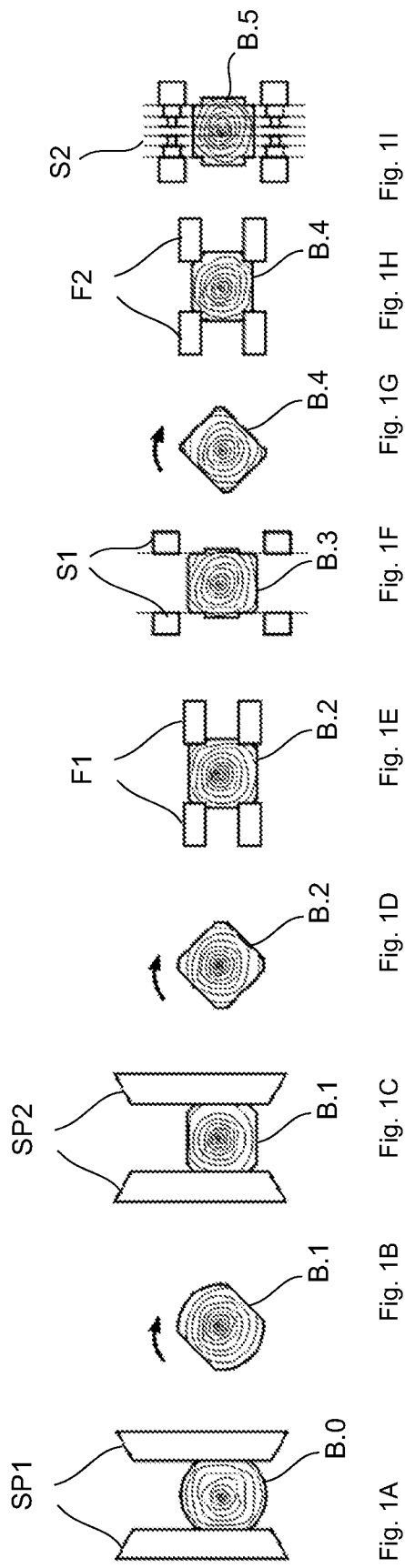
FIGS. 1A to 1I show a sequence of schematic illustrations of the working operations involved in dividing up tree trunks, on the basis of cross sections through a tree trunk after the individual processing steps.

Proceeding from the original cross section of a round timber B.0 (tree trunk), this is firstly, as shown in FIG. 1A, guided perpendicularly to the drawing plane through a first processing tool, referred to as a chipper canter SP1. The chipper canter SP1 removes the wane at two opposite sides and thus generates a workpiece B.1 with two plane-parallel surfaces. This is then rotated through 90° and guided into the second chipper canter SP2 shown in FIG. 1b, which cants the two remaining sides in order to remove the wanes.

A curvature that has been initially roughly determined in advance on the round timber B.0 is already taken into consideration in the processing by way of the chipper canters SP1, SP2, specifically such that, in the case of a curved round timber, two first plane-parallel, that is to say non-curved surfaces are firstly generated by virtue of the processing by the chipper canter SP1 taking place parallel to the curvature plane, and the workpiece B.1 is subsequently rotated through 90° (FIG. 1B) and is guided, in a curve that follows the arc of the previously determined curvature line, through the chipper canter SP2 (FIG. 1C), such that two second parallel but curved surfaces are formed.

The result is a curved squared timber with a cross section B.2. The squared timber B.2 has four canted surfaces, but still has remnants of wanes at the edges, which wanes are now removed in the further processing steps before the subsequent sawing.

For this purpose, the squared timber B.2 is now rotated again (FIG. 1D) and is milled at the edges by means of a milling device F1 shown in FIG. 1E. The milling device has four milling heads which are situated in each case oppositely in pairs and by means of which in each case one of the edges of the squared timber is milled out. In this way, not only are the remaining wanes at least partially removed, but the milled recesses simultaneously form an edging for the side product boards that are to be cut off. The milling heads on a respective side are fastened to a machine support (not shown) which, by way of corresponding actuators (for example hydraulic cylinders), allows an adjustment of the milling heads vertically and horizontally.

The squared timber B.3 subsequently passes through a sawing device S1 shown in FIG. 1F. The sawing device S1 generates two lateral incisions, which are situated exactly at the depth of the milled recesses generated in FIG. 1E, such that two first wane-free side boards are separated off. Since the processing in FIGS. 1E and 1F again takes place, as in FIG. 1A, parallel to the curvature plane, a cutting pattern may be implemented here taking into consideration a curvature.

The remaining squared timber B.4 has now become somewhat narrower in profile, but may still have remnants of wanes. To remove these, the squared timber B.4 is now rotated again (FIG. 1G) and guided through the milling cutter F2 shown in FIG. 1H. This milling cutter generates milled recesses along the edges of the squared timber B.4 and thus removes the remaining wanes. The squared timber is subsequently guided through a sawing device S2 which generates individual sawn timbers from the canted and milled squared timber B.5. Here, as can be seen from FIG. 1I, two somewhat narrower side boards are again produced in the region of the previously generated milled portions. The sawing device S2 (like the sawing device S1 also) may for example be a double arbor circular saw.

The curvature of the squared timber B.3 is taken into consideration in the cutting pattern by virtue of said squared timber being guided, following an arc along its curvature line, through the sawing device S2 or, in the case of active incision following an arc, the saw blades of the sawing device S2 being correspondingly positioned, and guided so as to follow the arc, during the pass. Exact knowledge of the curvature line of the squared timber B.3 is therefore of importance.

In general, the initial determination of the curvature performed on the round timber is not sufficient in order to obtain the desired production tolerances, such that, after the canting machining operation and before the subsequent sawing, a renewed measurement is performed in order to exactly determine the resulting curvature after the canting operation.

Figure 2:
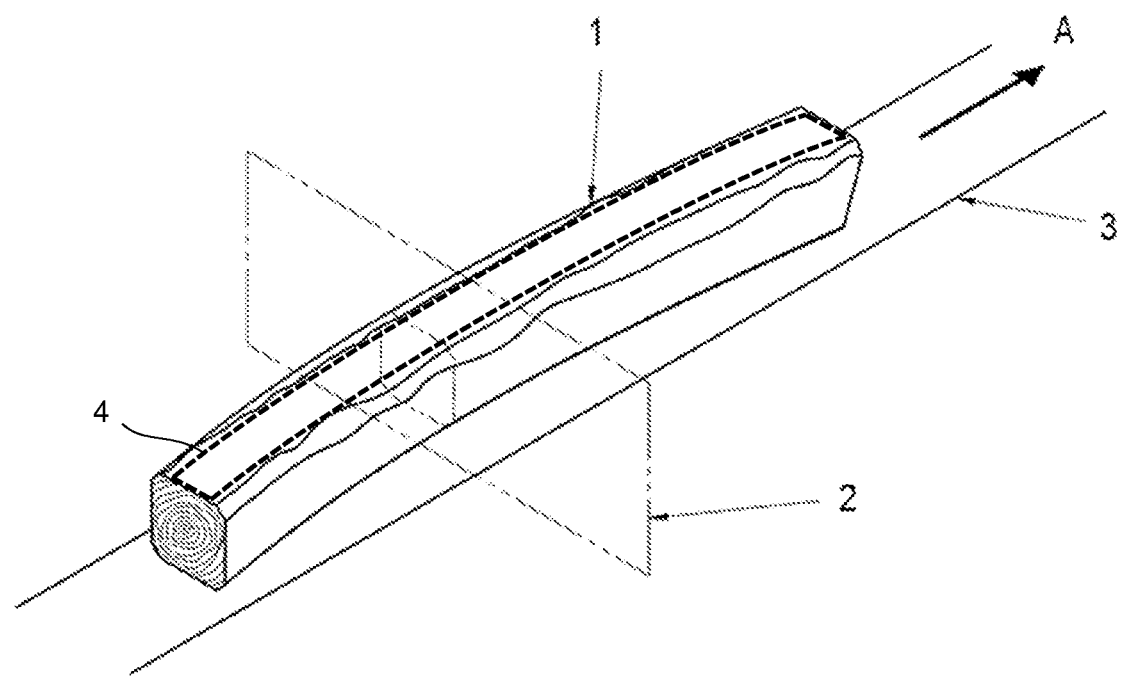
FIG. 2 shows a tree trunk that has been canted on four sides (squared timber), with an indicated contour of a rough sawn side product board with pre-calculated crook.

FIG. 2 illustrates, by way of example, a tree trunk that has been canted on four sides, or squared timber, after the processing step in FIG. 1C. As the squared timber 1 is transported longitudinally along a transport path 3 in a conveying direction A, the squared timber is measured. A measurement device 2 is schematically illustrated in this regard. The measurement may be performed for example optically, by means of a laser, by means of radar, or in some other way.

After the squared timber 1 has been measured, a cutting solution is ascertained on the basis of the geometrical measurement data. The cutting solution determines what side product and main product boards should be generated. For this purpose, possible dimensions of boards are mathematically fitted into the virtual model of the squared timber obtained by way of the measurement, in such a way that the most optimum possible yield of sawn timber is achieved. As part of the cutting solution, the so-called rough sawn side product is defined, which is firstly cut off in the cutting operation illustrated in FIG. 1F before the squared timber is rotated once again and divided up by way of corresponding vertical longitudinal cuts.

According to the present invention, provision is made here whereby side product boards generated in rough sawn form may have a crook that lies within a specifiable tolerance range. It is thus possible, in the ascertainment of the cutting solution, for side product boards to be mathematically fitted into the squared timber 1 in such a way that they follow a curvature of the trunk. The outline of a side product board with a corresponding crook is shown by way of example in FIG. 2. With the steps of rotating, milling and sawing shown in FIGS. 1D to 1F, the respective rough sawn side product board can be cut off.

Figure 3:
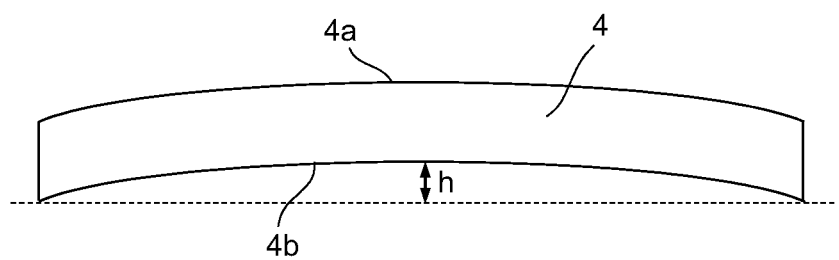
FIG. 3 shows the cut-off side product board from FIG. 2 with a curvature running over its narrow longitudinal side.

FIG. 3 illustrates a correspondingly generated rough sawn side product board 4 with a crook. The crook is indicated by way of the so-called arrow height h. The arrow height h of the longitudinal curvature is measured at the point of greatest deformation, and may be defined in absolute terms or, for example, in relation to a 2 m measurement length. By allowing crooked side product boards in this way, the sawn timber yield of rough sawn material can be increased by utilizing the natural crook of wooden trunks that are to be sawn.

In order to generate the crooked boards 4 shown in FIGS. 2 and 3, it is necessary, before the side product board 4 is cut off, for the squared timber to be profiled along the parallel curves 4a, 4b that form the narrow sides of the side product board 4. This is performed by actuation of the milling cutters F1 shown in FIG. 1E. In each case one milling cutter pair on the left-hand side and on the right-hand side is, during a feed movement A of the tree trunk 1, adjusted vertically so as to follow the arc 4a or 4b respectively. Here, the curves 4a, 4b on the left-hand side and on the right-hand side of the tree trunk 1 (cf. FIG. 1E) may differ. It is also possible for multiple side product boards to be generated in rough sawn form.

As milling heads of the milling device F1, use may be made of the tool heads described in the patent EP 1 807 249 B1, to the entire content of which reference is hereby made in order to avoid unnecessary repetitions. The combined milling and sawing segment head presented therein generates clean side edges of the side product boards by way of vertical and horizontal saw cuts, and also, by way of additional chipping blades, generates wood chips that are suitable for further use.

A milling head has two mutually perpendicular milling planes, wherein one generates the subsequent longitudinal edge of the side board, and the second lies approximately in the plane in which the saw cut by which the side board is cut off is subsequently performed. In order to prevent the milling heads from cutting in again during the adjustment movement, they may be simultaneously pivoted in addition to their adjustment movement. The pivoting movement expediently takes place such that the milling plane of the milling head with which the subsequent longitudinal edge is milled tangentially follows the arc in which the milling heads are adjusted relative to the tree trunk. The pivot axis thus lies perpendicular to the plane in which the saw cut by which the side board is cut off is performed. Such a pivoting movement is also referred to as a pitching movement.

Figure 4:
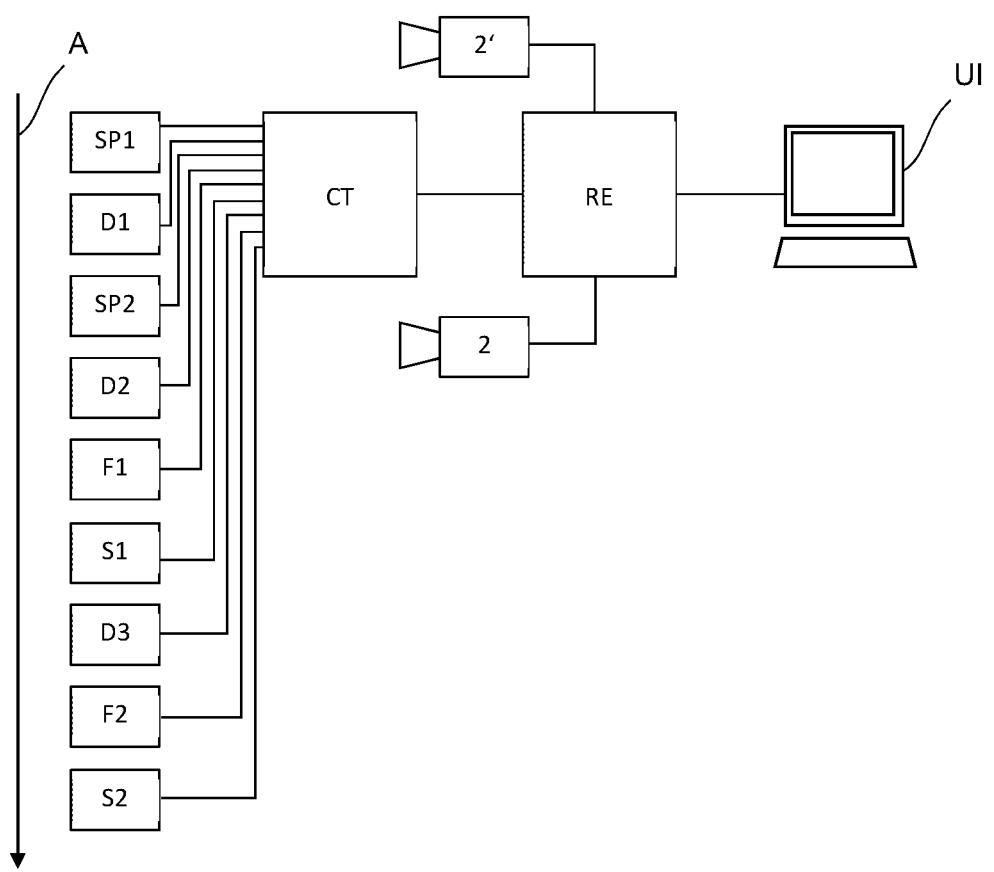
FIG. 4 shows a block diagram of a device for generating sawn timber, with a controller and additional calculation device for ascertaining a cutting solution.

FIG. 4 finally shows a block diagram of a device for producing sawn timber. The device comprises, in succession in a conveying direction A, the processing units shown in FIGS. 1A to 1I, specifically the chipper canter SP1, a first rotating device D1, the chipper canter SP2, a second rotating device D2, the milling device F1, the sawing device S1, a third rotating device D3, the milling device F2, and the sawing device S2. All processing units are actuated by a controller CT. This, in accordance with measurement data ascertained in advance, ensures a suitable initial rotation of the trunk prior to the first canting operation, a suitable arrangement of the chipper canters SP1, a rotation by the first rotating device D1, a suitable arrangement of the chipper canters SP2, and arcuate guidance, in accordance with the curvature of the tree trunk as ascertained by way of the measurement, of the trunk through the chipper canters SP2. The controller CT controls the rotation by the rotating device D2 and positions the milling heads of the milling device F1 and adjusts these relative to the tree trunk, during the feed movement of the latter, in accordance with the arc 4a, 4b ascertained for the specified crook. The controller CT controls the positioning of the sawing device S1 and the subsequent rotation in the rotating device D3. Finally, the controller CT controls the positioning of the milling cutters F2 and setting of the sawing device S2 and the guidance of the trunk, following an arc, through milling cutters F2 and sawing device S2.

The rotating devices may be implemented in a manner known per se by the use of rollers which are arranged in a frame that is rotatable through 90°. The processing and rotation of the tree trunk are performed in an uninterrupted forward movement. For this purpose, use is made of a transport device which may for example be implemented, in a manner which is likewise known per se, by means of rollers or chain conveyors. The transport device is preferably likewise actuated by the controller CT, which therefore controls the feed rate of the tree trunk.

A calculation device RE is additionally illustrated in FIG. 4. Said calculation device serves for ascertaining an optimized cutting solution. For this purpose, said calculation device is connected to an optical measuring unit 2, such as an arrangement of cameras or optical scanners. The measuring device 2 performs a measurement on the squared timber 1 that has been canted at four sides (profile B.2 in FIGS. 1A-1F) before the latter is rotated again. From the measurement data provided by the measuring unit 2, a virtual model of the squared timber 1 is generated, on the basis of which the calculation device RE calculates the optimized cutting solution by mathematically fitting possible sawn timber dimensions into the virtual model.

The crook of the side product boards that are to be generated in rough sawn form is also ascertained in the calculation of the cutting solution. The calculation device RE is equipped with a user interface UI by way of which a parameter (for example a maximum arrow height h) that describes an admissible tolerance range for a maximum admissible crook can be specified. The arc 4a, 4b that describes the subsequent edge profile of the rough sawn side product boards is in this case ascertained such that the resulting crook lies within the specified tolerance range.

The calculation device RE is additionally configured to ascertain an optimum initial rotation of the tree trunk prior to the first canting operation. For this purpose, a further optical measuring unit 2' is provided, by means of which, prior to the first canting operation, the tree trunk is scanned in order to ascertain its curvature and in order to calculate an initial rotation with which the "main" curvature lies in a vertical plane, such that, by means of the chipper canters SP1, two parallel, planar side surfaces can be generated and, after a rotation through 90°, the trunk can be guided, following the arc of its curvature, through the second chipper canters SP2, such that two second parallel but curved side surfaces of the squared timber 1 are generated.

The calculation device RE may, as shown in FIG. 4, be implemented as or by a separate programmable processor, or else in a manner integrated with the controller CT on one common programmable processor, wherein the calculation device RE and controller CT may be implemented by way of separate computer programs or else by way of corresponding subroutines of one common integrated computer program.

It is finally pointed out that the invention is not restricted to a cutting pattern following an arc at the resawing stage, or a two-stage measurement for ascertaining the cutting solution. Rather, the measurement and calculation of the cutting solution may also be performed on the round timber prior to the canting operation, and the cutting pattern for the dividing-up of the squared timber at the resawing stage may be implemented by way of straight cuts without taking into consideration a curvature.

The invention claimed is:

1. A method for producing sawn timber from a tree trunk (B), the method comprising:
    canting or straightening the tree trunk (B) by slabbing at at least two sides,
    milling out a remaining wane region at at least two mutually opposite corner regions using milling tools (F1),
    cutting off a side product board (4) using a saw cut along a plane bounded by the corner regions,
    wherein the milling out of the at least two mutually opposite corner regions, includes moving the milling tools (F1) relative to the tree trunk (B) in an arc (4a, 4b), predefined based on a curvature profile of the tree trunk (B), such that during a feed movement of the tree trunk (B) relative to the milling tools (F1), said milling tools are adjusted to follow the arc (4a, 4b) to define edges of the side board product that are intentionally crooked.

2. The method according to claim 1, further comprising rotating the tree trunk (B) such that a curvature of the tree trunk lies in a vertical plane for the milling-out of the corner regions.

3. The method according to claim 2, further comprising, after the cutting off of at least the side product board (4), rotating the tree trunk (B) such that the curvature lies in a horizontal plane, and subsequently guiding the tree trunk (B) in a trajectory that follows the curvature, through a vertically incising sawing device (S2).

4. The method according to claim 1, further comprising defining the arc such that the cut-off side product board (4) has a crook that lies within a specified or specifiable tolerance range.

5. The method according to claim 1, further comprising ascertaining the arc (4a, 4b) along which the milling tools (F1) are moved relative to the tree trunk in a manner dependent on a curvature of the tree trunk (B) by a measurement that yield a curve which has a different curvature in certain portions.

6. The method according to claim 5, wherein the measurement of the tree trunk (B, 1) is performed after the tree trunk has been canted at the at least two sides.

7. The method according to claim 1, wherein the moving of the milling tools (F1) to follow the predefined arc (4a, 4b) further comprises pivoting the milling tools.

8. A device for producing sawn timber from a tree trunk (B), the device comprising:
    one or more chipper canters (SP1, SP2) or saws arranged to cant the tree trunk (B), or straighten the tree trunk by slabbing, at at least two sides;
    two or more milling tools (F1) arranged to mill out a remaining wane region at at least two mutually opposite corner regions;
    a sawing device (S1) arranged to cut off a side product board (4) by a saw cut along a plane bounded by the corner regions; and
    a controller (CT) that actuates the one or more chipper canters and the two or more milling tools to mill out the corner regions, such that the milling tools (F1) are moved relative to the tree trunk (B) in an arc (4a, 4b), predefined based on a curvature profile of the tree trunk (B), so that during a feed movement of the tree trunk (B) relative to the milling tools (F1), said milling tools are adjusted to follow the arc (4a, 4b) in order to cut a side product board having edges that are intentionally crooked.

9. The method according to claim 1, wherein the milling tools are adjusted vertically to follow the arc (4a, 4b).

10. The method according to claim 5, wherein the curve has an opposite curvature in certain portions.

11. The method according to claim 7, wherein the pivoting of the milling tools includes pivoting such that a milling plane defined by each respective one of the milling tools (F1) tangentially follows the arc (4a, 4b).

* * * * *